United States Patent
Ziemkowski

(10) Patent No.: US 7,460,773 B2
(45) Date of Patent: Dec. 2, 2008

(54) AVOIDING IMAGE ARTIFACTS CAUSED BY CAMERA VIBRATION

(75) Inventor: Theodore B. Ziemkowski, Ft. Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 397 days.

(21) Appl. No.: 11/294,782

(22) Filed: Dec. 5, 2005

(65) Prior Publication Data

US 2007/0127902 A1    Jun. 7, 2007

(51) Int. Cl.
*H04N 5/228* (2006.01)
*G03B 17/00* (2006.01)

(52) U.S. Cl. .................. 396/52; 396/53; 348/208.99

(58) Field of Classification Search ............. 396/52–55, 396/266, 263, 72, 79, 153, 237; 348/208.11–208.16, 348/208.99
See application file for complete search history.

(56) References Cited

U.S. PATENT DOCUMENTS

| 5,559,574 A * | 9/1996 | Kai et al. ..................... 396/55 |
| 6,809,758 B1 * | 10/2004 | Jones ..................... 348/208.99 |
| 2004/0130628 A1 * | 7/2004 | Stavely ..................... 348/208.4 |

FOREIGN PATENT DOCUMENTS

JP    10-232418    9/1998

OTHER PUBLICATIONS

Panasonic, Color CCTV Camera, Operating Instructions, 2 pgs.

* cited by examiner

*Primary Examiner*—Reena Aurora

(57) ABSTRACT

Methods and apparatus are disclosed for avoiding image artifacts caused by camera vibration. The taking of one or more photographic exposures is timed in relation to the vibration, so as to avoid motion blur, video jitter, or both. The vibration may be characterized by motion sensors, or by analysis of image data.

23 Claims, 7 Drawing Sheets

AVOIDING IMAGE ARTIFACTS CAUSED BY CAMERA VIBRATION

FIELD OF THE INVENTION

The present invention relates generally to photography.

BACKGROUND

Image artifacts caused by camera motion are a common problem in photography. At least two kinds of undesirable artifacts can occur.

When camera motion occurs during the exposure of a photograph, the resulting photograph can be blurred because each point on the recording medium receives light from many scene locations during the exposure. This blurring can be minimized by taking photographs using very short exposure times, but this may not be possible in all conditions. A "fast" lens, that is, a lens that has a large aperture for light collection, can enable short exposure times, but such lenses are often bulky and expensive.

The second artifact is especially troublesome in video photography, in which a sequence of images is taken. Camera motion may cause the camera to be aimed in different directions for successive frames. Even if the individual video frames are not blurry, the resulting video sequence may "jitter" or appear "jumpy" when replayed. Of course, both blur and jitter can occur together.

Some cameras or lenses include sensors for characterizing camera motion and mechanisms for moving an optical component so as to counteract the effects of camera motion. However, these systems are often expensive and complex.

Often, a camera user attempts to avoid motion artifacts by holding the camera still using a tripod or other device, or by mounting the camera on a fixed object. However, in some cases even a fixed object is subject to vibration that can result in image blur, jitter, or both. For example, a surveillance camera mounted on a light pole may vibrate dramatically during windy weather, resulting in degradation of photos or video taken by the camera.

DETAILED DESCRIPTION

Figure 1:
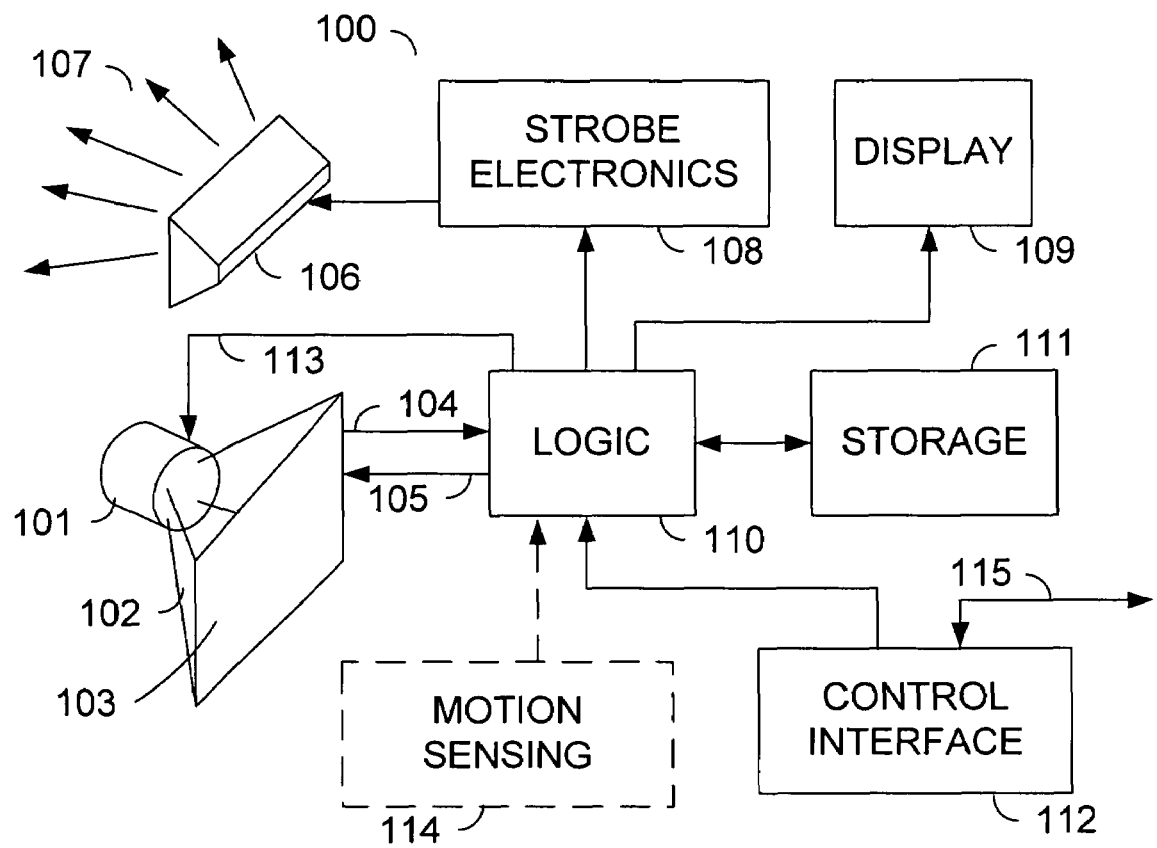
FIG. 1 shows a simplified block diagram of a digital security camera in accordance with an example embodiment of the invention.

FIG. 1 shows a simplified block diagram of a digital security camera 100 in accordance with an example embodiment of the invention. A lens 101 gathers light emanating from a scene, and redirects the light 102 such that an image of the scene is projected onto an electronic array light sensor 103. Electronic array light sensor 103 may be an array of charge coupled devices, commonly called a "CCD array", a "CCD sensor", or simply a "CCD". Alternatively, electronic array light sensor 103 may be an array of active pixels constructed using complementary metal oxide semiconductor technology. Such a sensor may be called an "active pixel array sensor", a "CMOS sensor", or another similar name. Other sensor technologies are possible. The light-sensitive elements on electronic array light sensor 103 are generally arranged in an ordered rectangular array, so that each element, or "pixel", corresponds to a scene location.

Image data signals 104 are passed to logic 110. Logic 110 interprets the image data signals 104, converting them to a numerical representation, called a "digital image", a "digital photograph", or simply an "image" or "photograph". A digital image is an ordered array of numerical values that represent the brightness or color or both of corresponding locations in a scene or picture. Logic 110 may perform other functions as well, such as analyzing digital images taken by the camera for proper exposure, adjusting camera settings, performing digital manipulations on digital images, managing the storage, retrieval, and display of digital images, accepting inputs from a user of the camera, and other functions. Logic 110 also controls electronic array light sensor 103 through control signals 105. Logic 110 may comprise a microprocessor, a digital signal processor, dedicated logic, or a combination of these.

Storage 111 comprises memory that may be used for storing such items as digital images taken by the camera, camera setting information, program instructions for logic 110, and other items. Control interface 112 connects to other equipment, such as a central computer, which exchanges data with camera 100 over a communication link 115. The exchanged data may include digital image transferred from camera 100 to the other equipment, or control instructions sent from the other equipment to camera 100, or both, or other kinds of data.

A display 109 may be provided for displaying digital images taken by the camera. A flash or strobe light 106 may provide supplemental light 107 to the scene, under control of strobe electronics 108, which are in turn controlled by logic 110. Logic 110 may also provide control signals 113 to control lens 101. For example, logic 110 may adjust the focus of the lens 101, and, if lens 101 is a zoom lens, may control the zoom position of lens 101.

Motion sensing element 114, present in some example embodiments of the invention, senses motion of camera 100, and supplies information about the motion to logic 110.

Figure 2:
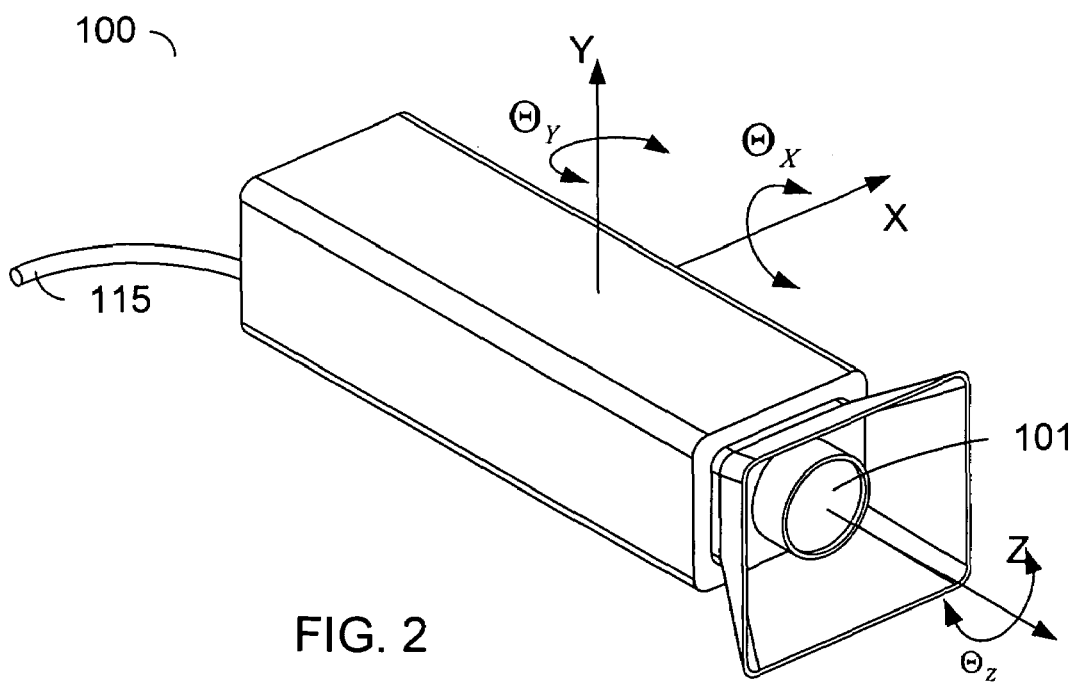
FIG. 2 shows a perspective view of the example camera of FIG. 1, and illustrates a coordinate system convenient for describing motions of camera.

FIG. 2 shows a perspective view of example camera 100, and illustrates a coordinate system convenient for describing motions of camera 100. Rotations about the X and Y axes, indicated by rotation directions $\Theta_X$ and $\Theta_Y$ (often called pitch and yaw respectively), are the primary causes of image blur or jitter due to camera shake. Translations in the X and Y axes may also be significant causes of image artifacts. Translation in the Z axis and rotation about the Z axis are also possible, if less likely, causes of image artifacts.

Figure 3:
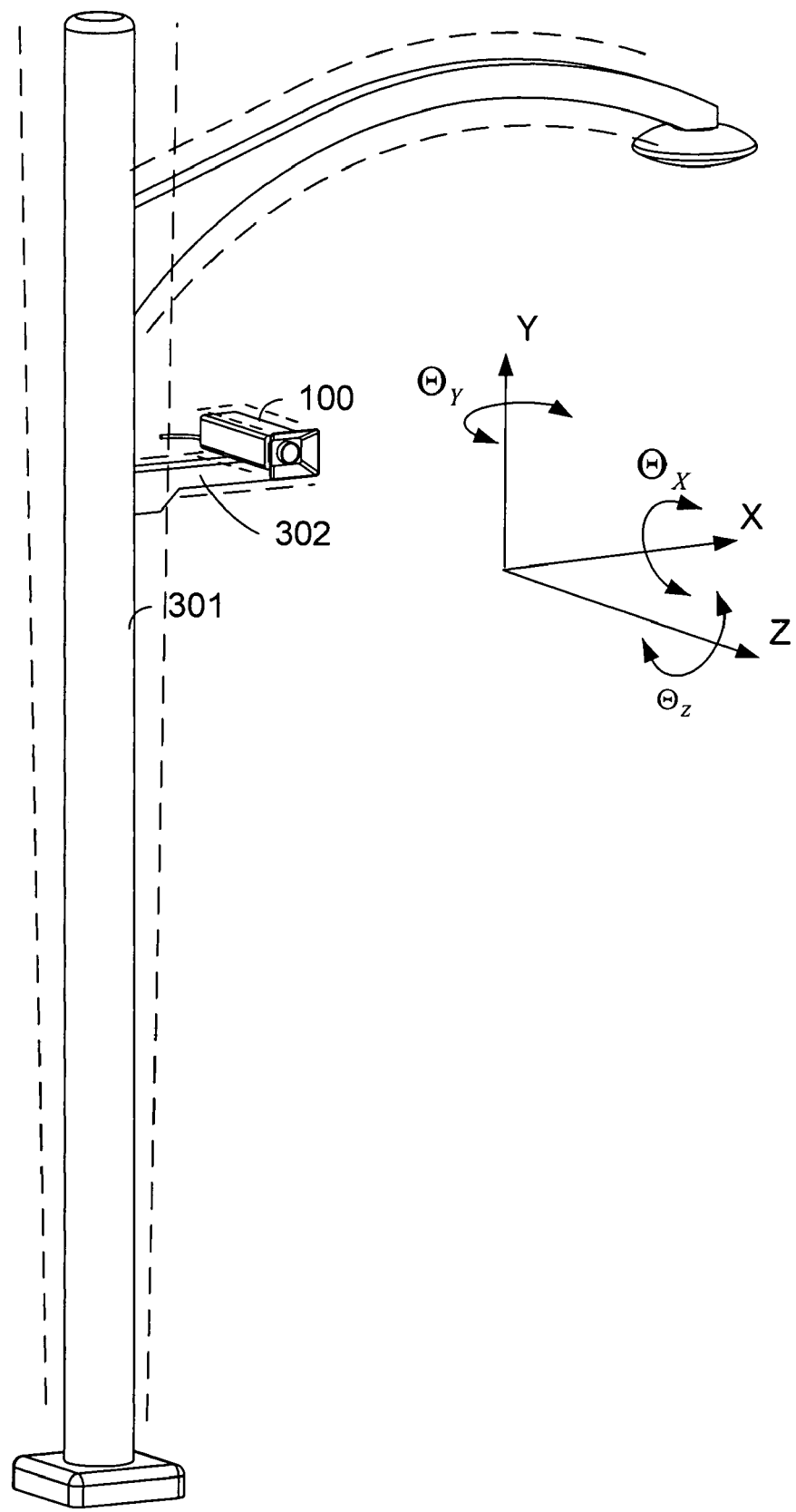
FIG. 3 shows the example camera of FIG. 1 in use as a security camera.

FIG. 3 shows example camera 100 in use as a security camera. In FIG. 3, camera 100 is mounted on light pole 301, which is subject to vibration as indicated by dashed lines.

Some vibration modes that may cause motion of camera 100 may include bending of pole 301, torsion of pole 301 about its longitudinal axis, bending of bracket 302, torsion of bracket 302, whip or whirl of pole 301 or bracket 302 or both, or other vibration modes of various parts of the system.

In accordance with an example embodiment of the invention, the taking of photographic exposures by camera 100 is timed in relation to the vibration so as to substantially avoid image degradation caused by the vibrating motion. The photographic exposures may be still photographs or video frames, or both. The image degradation may include artifacts such as motion blur, jitter, or both.

In a first example embodiment, camera 100 may avoid blur or jitter by taking photographs or video frames only when camera motion, as measured by motion sensing unit 114, satisfies a motion criterion chosen to minimize motion blur. Pending U.S. patent application Ser. No. 10/339,132, having a common assignee with the present application, describes techniques for tracking camera motion and selecting a time for taking a photograph. The full disclosure of that application is hereby incorporated by reference.

Motion sensing unit 114 may comprise one or more linear accelerometers, rotational accelerometers, rate gyroscopes, or other devices that produce signals indicative of camera motion. Different kinds of motion sensing devices may be used in combination. Preferably, motion sensing unit 114 comprises one or more rate gyroscopes. Each rate gyroscope may be, for example, a model EMC-03MA rate gyroscope available from Murata Manufacturing Co., Ltd., of Kyoto, Japan. A rate gyroscope produces a voltage proportional to the rate at which the gyroscope, and also therefore the device to which it is mounted, is rotating. More than one rate gyroscope may be used in order to characterize rotations about more than one axis.

Figure 4:
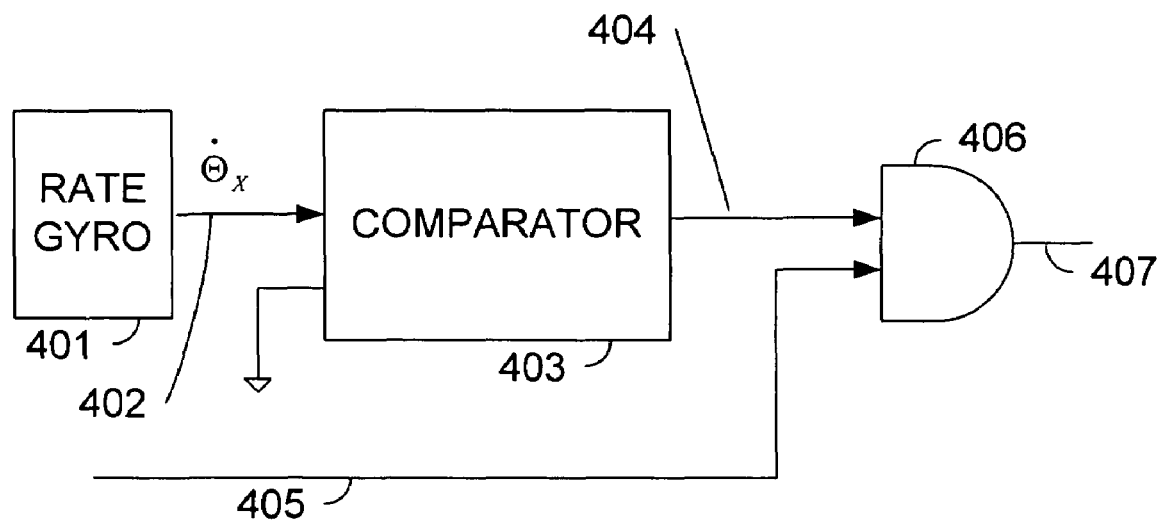
FIG. 4 shows a simplified block diagram of a control system in accordance with an example embodiment of the invention.
Figure 5:
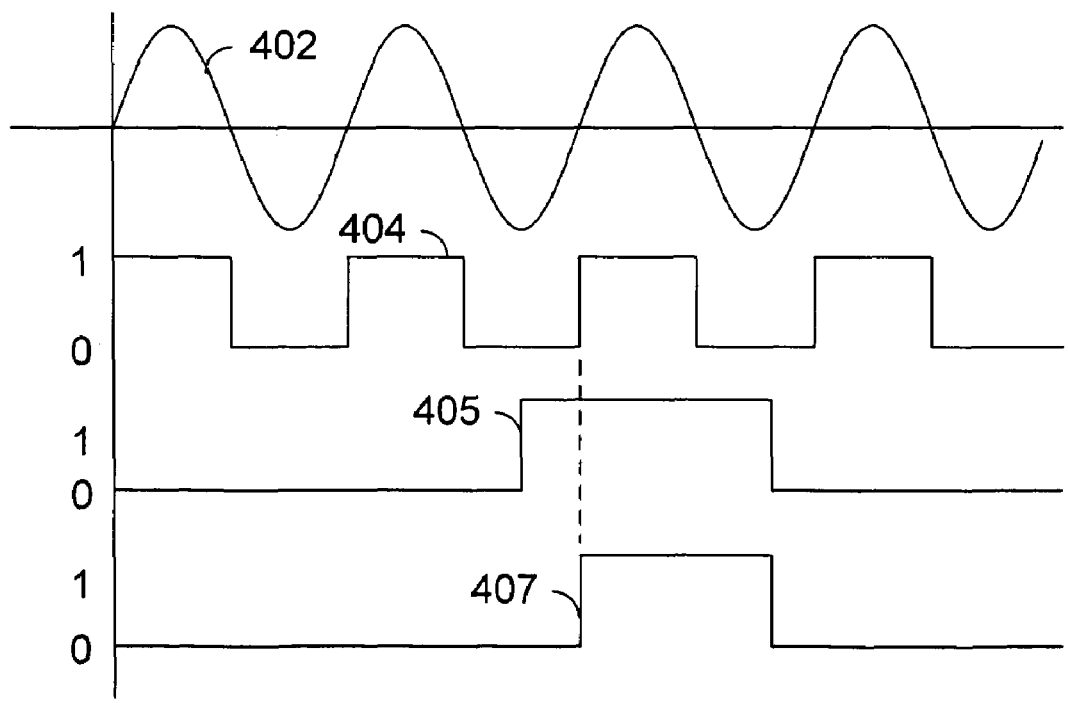
FIG. 5 shows a timing diagram of certain signals represented in FIG. 4.

FIG. 4 shows a simplified block diagram of an example control system for taking a photograph or video frame when a particular motion criterion is satisfied. FIG. 5 shows a timing diagram of certain signals represented in FIG. 4. FIGS. 4 and 5 are best read together. Rate gyroscope 401, comprised in camera 100, measures rotation of camera 100 about the X axis. Motion about other axes may be used as well. Because the motion is oscillatory, rate gyroscope 401 produces a generally oscillating signal 402. Comparator 403 translates the oscillating signal into a digital direction indicating signal 404. Digital direction indicating signal 404 is a logic "high" or "1" when camera 100 is rotating in a positive direction ($\Theta_X > 0$), and is a logic "low" or "0" when camera 100 is rotating in a negative direction ($\Theta_X < 0$). (The choice of which direction is positive is completely arbitrary.) Transitions in direction indicating signal 404 indicate times when the motion direction reverses. Because the speed of motion near a time of reversal is low (and momentarily is zero at the instant of reversal, at least in the axis measured), a photograph or video frame taken at the time of a transition of digital direction indicating signal 404 is likely to have relatively little blur.

Trigger signal 405 is a signal indicating that a photograph or video frame is to be taken. Trigger signal 405 may come from other equipment through control interface 112, or may be supplied by a timing circuit within camera 100, or may come from some other source. Trigger signal 405 and direction indicating signal 404 are supplied to AND gate 406, which generates a synchronized trigger signal 407. Synchronized trigger signal 407 is a logic "high" only when both input signals to AND gate 406 are high. In this example, camera 100 is configured to take a photograph or video frame when a rising edge occurs on synchronized trigger signal 407.

The effect of this example circuit is to delay capture of a photograph or video frame initiated by trigger signal 405 until a transition occurs in direction indicating signal 404. In this way, camera 100 increases the likelihood that the photograph or video frame is taken at a time when the speed of motion of camera 100 is near a minimum, at least in one axis, and therefore also increases the likelihood that the photograph or video frame will have relatively little blur.

One of skill in the art will readily recognize that the function of the circuit of FIG. 4 may be accomplished in many other ways, within the scope of the appended claims. For example, the logic senses of the digital signals could be reversed. Or the functions of comparator 403 and AND gate 406 may be performed using a program executing on a microprocessor with appropriate input/output capability. Camera rotation information may be provided by a rotational accelerometer whose signal is integrated to provide angular velocity signal 402. A linear accelerometer and an integrator may be used to characterize oscillating linear motion, supplying a signal analogous to and used in place of angular velocity signal 402. Many other implementations are possible.

Especially if the motion of camera 100 is oscillatory in substantially only one axis, the system of FIG. 4 or some similar implementation is likely to greatly reduce motion blur, as compared with a system that takes photographs or video frames without regard to camera motion. The small delay incurred by waiting until a velocity reversal occurs in the camera motion before taking a photograph or video frame will in many cases be negligible. If desired, the circuit of FIG. 4 or an equivalent implementation could be modified to provide that the delay not exceed some predetermined maximum time. For example, camera 100 could be configured to take a photograph no later than 100 milliseconds after trigger signal 405 is asserted, even if no transition of direction indicating signal 404 occurs. Each kind of delay, whether that induced by waiting for a motion criterion to be satisfied or that induced by taking a video frame after a predetermined maximum delay, may cause video frames to be taken at intervals that are not perfectly uniform, or that are not on average taken at a standard repetition frequency. However, in many applications, such as in a security camera, the speed of replay of video may be varied considerably without detracting from the performance of the camera for its intended purpose.

The circuit of FIG. 4 or its equivalent is also effective in reducing or eliminating video jitter in many cases. Because motion direction reversals are likely to occur repeatedly at approximately the same camera location, each video frame taken at a direction reversal will be taken with the camera aimed in approximately the same direction in which it is aimed for other video frames. Other motion criteria may be used as well. For example, if one or more accelerometers are used to measure the camera motion, a circuit similar to that in FIG. 4 could cause photographs or video frames to be taken upon reversals of acceleration of camera 100.

In a second example embodiment of the invention, camera position information is used, rather than velocity information, for selecting times at which to take photographs or video frames. This second example embodiment is especially useful for reducing video jitter in applications where a camera may be vibrating in more than one axis, or where the vibration includes multiple frequency components. In this second example embodiment, a camera monitors its position, and takes subsequent photographs or video frames when the camera is positioned at approximately the same place as it was for the taking of previous frames. The resulting video stream appears relatively stable due to the effect of aliasing. Because video frames are taken with a frequency that is approximately an integer submultiple of the frequency of the camera vibration, the apparent camera vibration, as evidenced by the video stream, may appear to be nonexistent or may appear to occur at such a low frequency as to not be objectionable. The practice of the invention is not limited to cases where the vibration is of constant frequency. The camera motion may be of varying frequency, may have several modes, or may be random.

Figure 6:
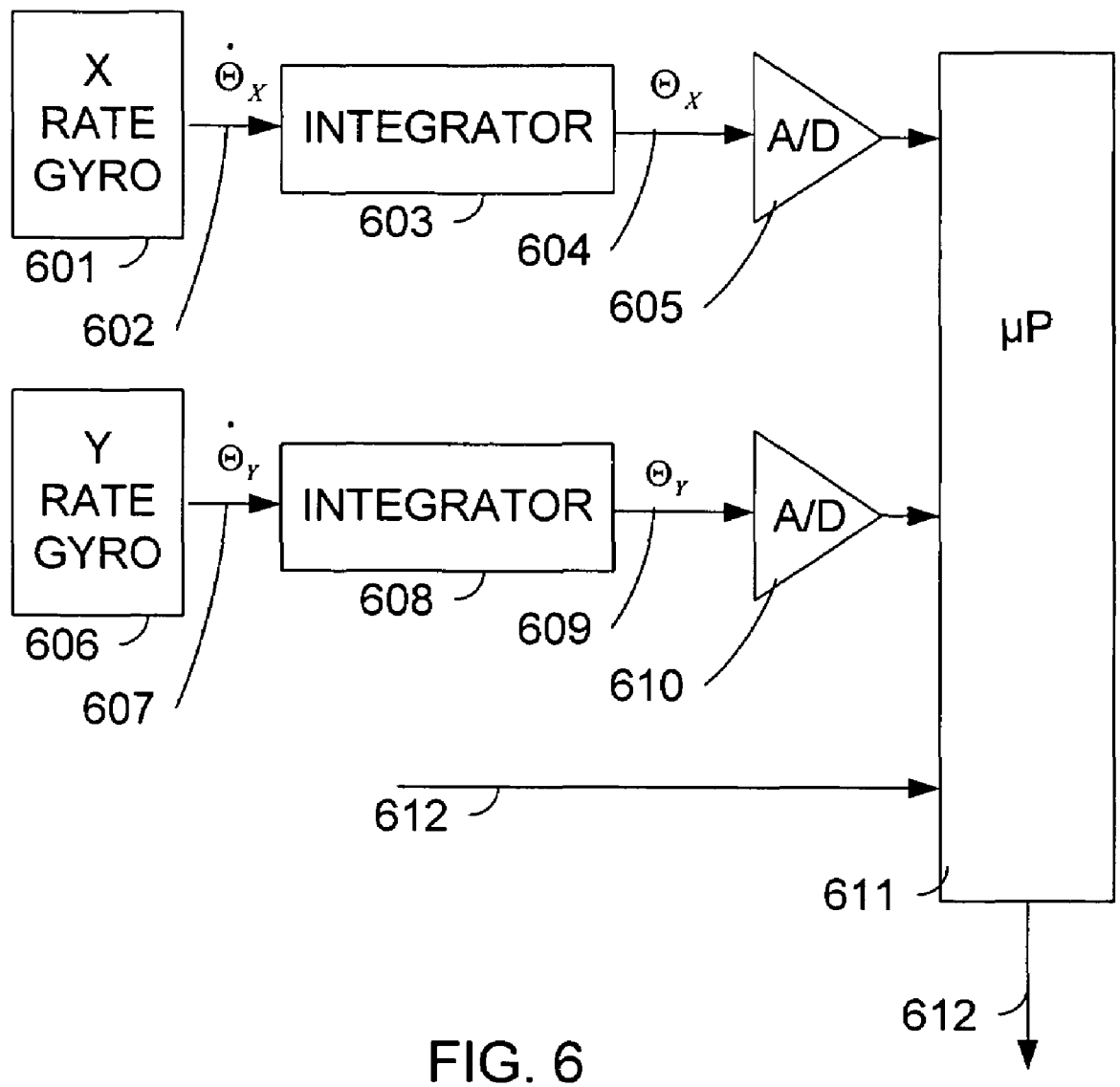
FIG. 6 illustrates a control system in accordance with a second example embodiment of the invention.

FIG. 6 illustrates an example control system for timing the taking of photographs or video frames based on camera position. The system of FIG. 6 measures camera motion in two rotational axes, but one of skill in the art will recognize that in many applications, a single axis will suffice, or that more than two axes of motion may be measured. Translational motions may be measured instead of or in addition to rotational motions.

In the system of FIG. 6, two rate gyroscopes 601 and 606 measure rotations of camera 100 about the X and Y axes respectively, producing rate signals 602 and 607. Integrators 603 and 608 integrate rate signals 602 and 607 respectively, producing position signals 604 and 609. Analog-to-digital converters 605 and 610 convert position signals 604 and 609 to digital values, which are then processed by microprocessor 611. Microprocessor 611 also receives trigger signal 612, and combines it with the digitized position signals to produce synchronized trigger signal 613.

While FIG. 6 shows one example system configuration, many other configurations are possible within the scope of the appended claims. For example, rate signals 602 and 607 could be digitized by A/D converters, and microprocessor 611 could perform the function of integrators 603 and 608. Or the function of microprocessor 611 could be performed by a series of comparators and digital logic, similar to the technique used in FIG. 4. Many other configurations are possible.

Figure 7:
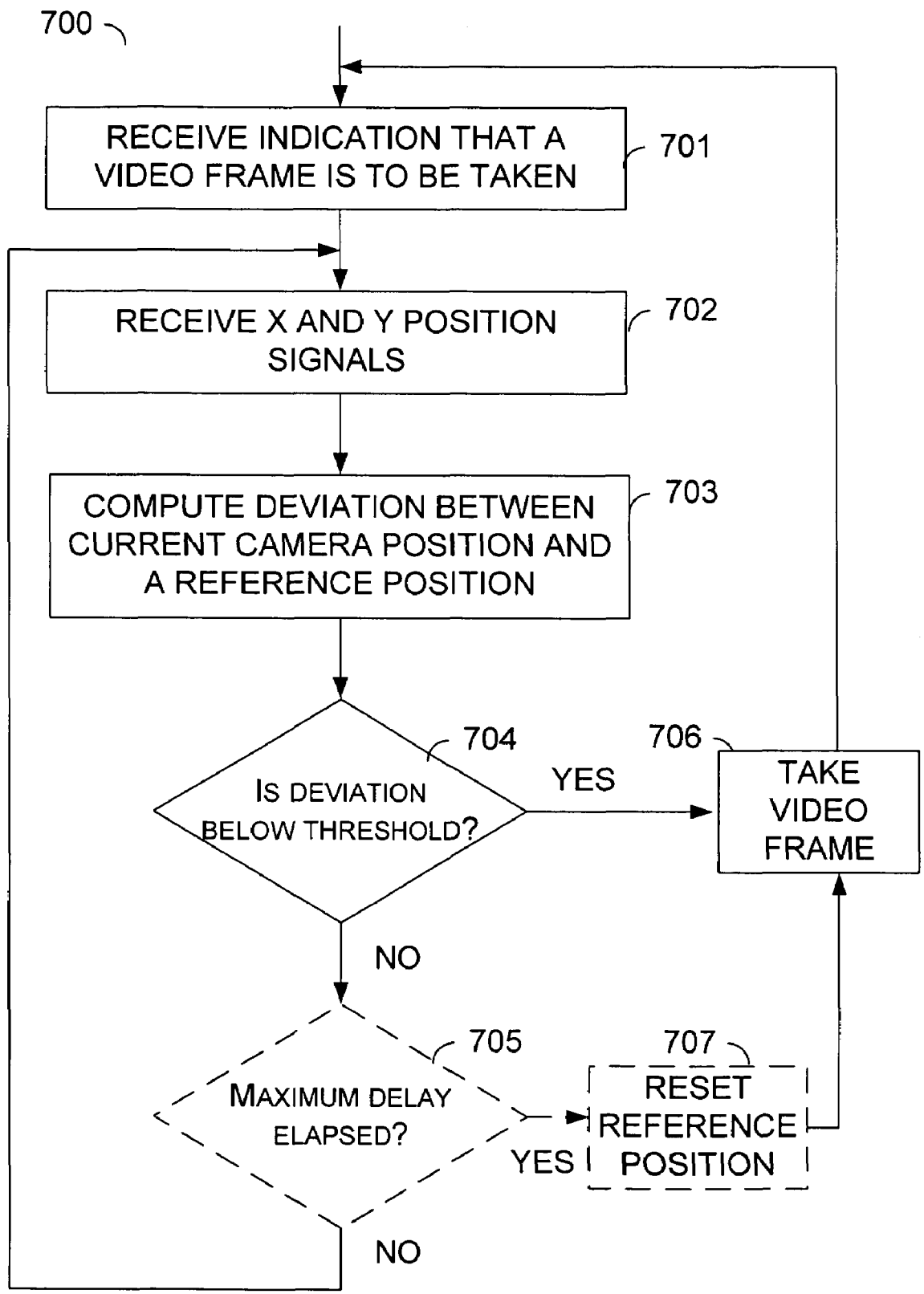
FIG. 7 shows a flow chart of a method in accordance with the second example embodiment of the invention.

FIG. 7 shows a flow chart of an example method 700 performed by microprocessor 611. Microprocessor 611 may be comprised in logic unit 110 of camera 100. In step 701, an indication is received that a video frame is to be taken. For example, other equipment may assert trigger signal 612, or a signal may be provided by a timer that times the interval between video frames. In step 702, the position signals are received. In step 703, a deviation is computed between the current camera position and the position at which the camera was located at some previous time. For example, the previous time may be the beginning of a video sequence, or may be the time at which the most recent previous video frame was taken, or some other time. The deviation is an indication of how much the camera position differs from a reference position recorded at the previous time, as measured motion sensing unit 114. In one example preferred embodiment, the deviation is computed as:

$$\text{Deviation}=\sqrt{(\Theta_X-\Theta_{X0})^2+(\Theta_Y-\Theta_{Y0})^2}$$

where $\Theta_{X0}$ and $\Theta_{Y0}$ are the angular positions $\Theta_X$ and $\Theta_Y$ measured at the reference position. Many other methods of computing the deviation are possible. For example, the deviation could be computed as:

$$\text{Deviation}=|\Theta_X-\Theta_{X0}|+|\Theta_Y-\Theta_{Y0}|$$

In step 704, the deviation is compared with a predetermined threshold amount that has been selected by the camera designer or operator. The threshold amount should be small enough that jitter in the resulting video is reduced, but large enough that the camera is likely to regularly return to a location separated from the reference position by less than the deviation. The exact value for the predetermined threshold will depend on the camera characteristics, the characteristics of the camera mounting, the expected vibration, and the desired performance. If the deviation is less than the predetermined threshold amount, control passes to step 706, where a video frame is taken, and then control passes back to step 701 where the system waits for and receives an indication that the next video frame is to be taken.

If the deviation is greater than the predetermined threshold amount, control passes to optional step 705 or back to step 702. In optional step 705, the delay that has elapsed since the indication that a video frame is to be taken is compared with a predetermined maximum delay. If the delay exceeds the maximum, control passes to step 706 where a video frame is taken, even though the deviation is above the threshold amount. This optional test ensures that some video frames will be taken periodically, even if the camera never returns to its reference position. The system may reset the reference position in optional step 707 after a timeout has occurred. This will likely cause a single jump in the video stream, but may increase the likelihood of the camera regularly returning to the reference position. Steps 702, 703, and 704 (and optionally, step 705) may be traversed only once or may be traversed many times for a particular video frame, as the system waits for the camera to revisit the previous position.

Figure 8:
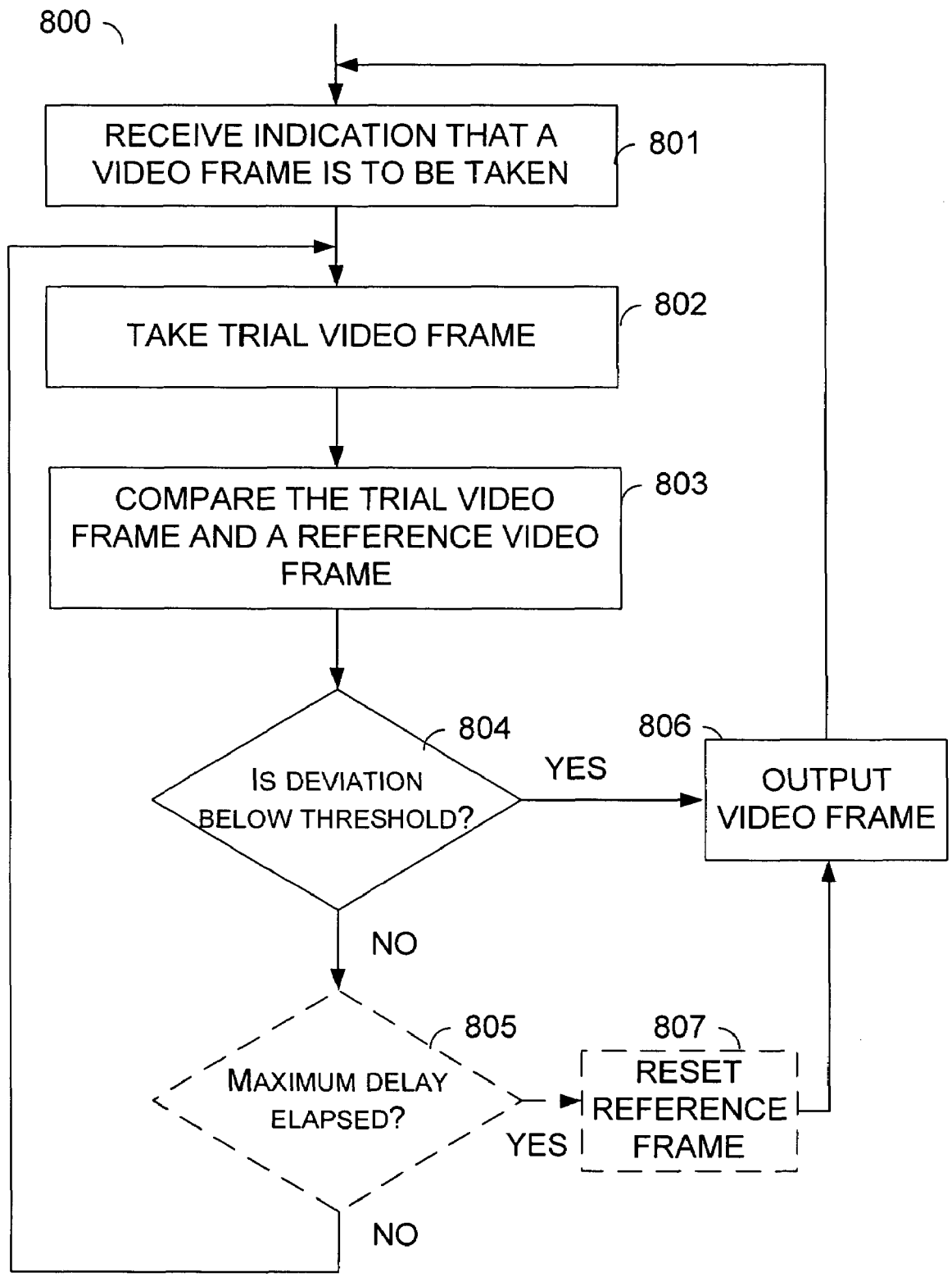
FIG. 8 shows a flowchart of a method in accordance with a third example embodiment of the invention.

In a third example embodiment of the invention, camera 100 uses image data to estimate its position, rather than data from sensors such as accelerometers or rate gyroscopes. FIG. 8 shows a flowchart of a method 800 in accordance with this example embodiment. Method 800 may be performed by logic unit 110 of camera 100. In step 801, an indication is received that a video frame is to be taken. For example, other equipment may assert trigger signal 612, or a signal may be provided by a timer that times the interval between video frames. In step 802, a trial video frame is taken. In step 803, the trial video frame is compared with a reference video frame, taken at an earlier time, to determine a deviation between the trial frame and the reference frame. For example, a correlation value may be computed indicating how well features in the two frames match. Image correlation is well known in the art. If the correlation is good, it may be assumed that the camera position at the time the trial video frame was taken is approximately the same as the camera position at the time the reference frame was taken.

In step 804, the deviation between the frames is compared to a predetermined threshold value. The threshold value will be chosen based on many factors, including the sizes of the images, the particular correlation formula used, and the desired performance of the system. If the deviation is below the threshold value, the trial video frame is output at step 806 as the requested video frame. If the deviation is too large, control passes back to step 802, where another trial video frame is taken, in hopes that the camera has moved to the position at which the reference frame was taken. Steps 802, 803, and 804 may be performed one time or many times for each video frame output. Preferably, these steps can be performed rapidly, so that several trial frames are taken during each cycle of camera vibration.

Optionally, the camera may output the trial video frame even if the deviation is large, if too much time has passed since a video frame was requested. In optional step 805, the time since a video frame was requested (step 801) is compared with a predetermined maximum value. If the delay is longer than the predetermined maximum, control passes to step 806 where the trial frame is output. Optionally, the system may reset the reference frame in step 807. For example, the reference frame may be replaced with the trial frame about to be output. This will likely cause a single jump in the resulting video sequence, but may improve the likelihood that later frames will be taken without timeouts.

When a correlation value is computed in step 803, motion of subjects in the scene may cause the correlation value to indicate poor correlation, even if the camera has not moved between the taking of the reference frame and the trial frame. For example, a passing car captured in a video frame by a surveillance camera may cause the correlation to be poor with a reference frame not containing an image of a passing car. In other words, subject motion may be mistaken for camera motion.

In order to minimize this effect, the camera may use only a portion of each frame to measure correlation. For example, subject motion may be more likely to occur in the center of a frame than on the edges, as the camera is likely to be aimed at an area of frequent activity. The periphery of each video frame may contain images of stationary background objects. For example, camera 100 used as a surveillance camera as in FIG. 3 may be aimed at a street intersection so that traffic is monitored. However, background objects at the periphery of each frame may include buildings and other stationary objects. Comparing only the periphery of each trial frame with the periphery of each reference frame may reduce the effects of subject motion.

Figure 9:
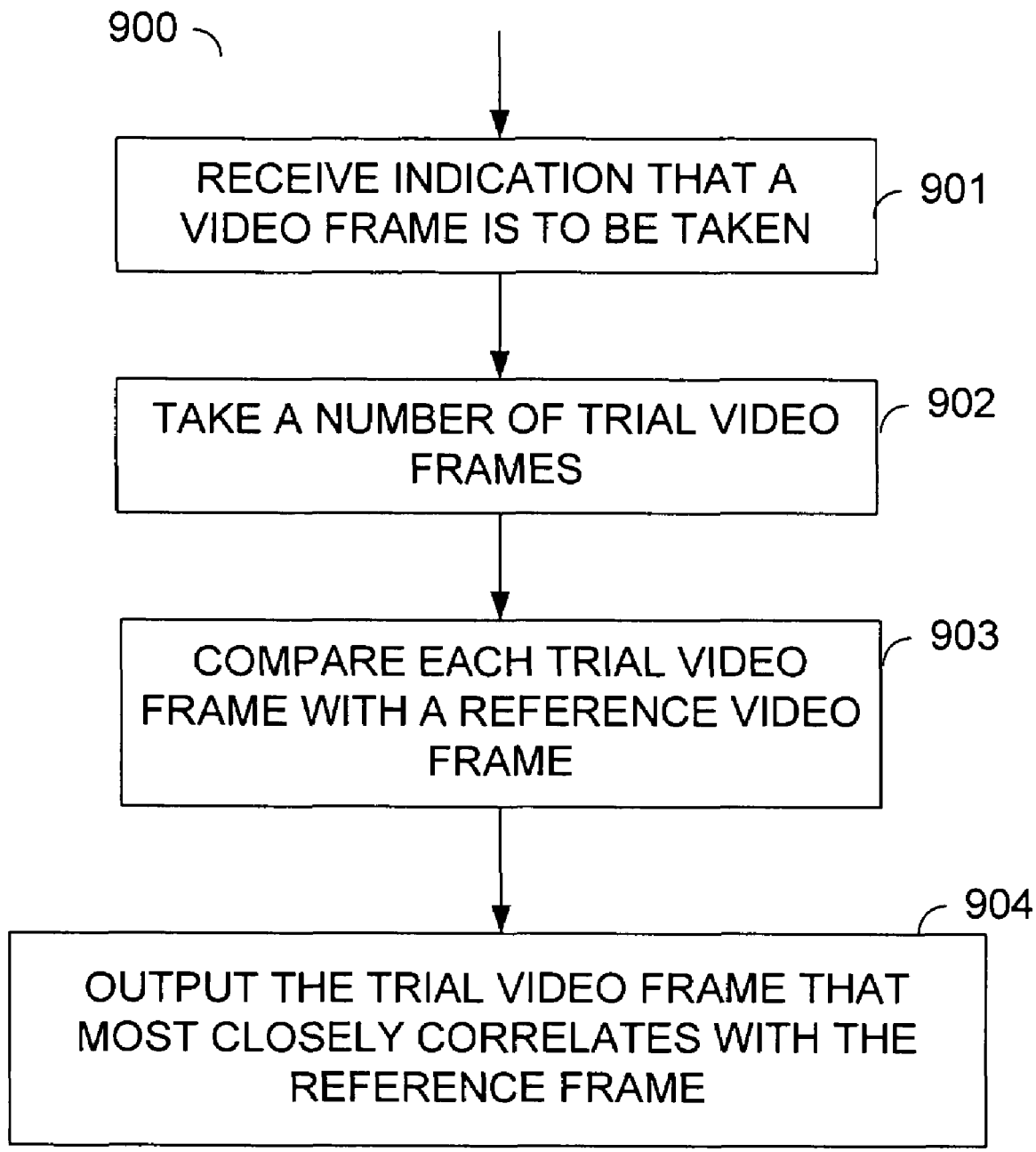
FIG. 9 shows a flowchart of a method in accordance with a fourth example embodiment of the invention.

FIG. 9 shows a flowchart of a method 900 in accordance with a fourth example embodiment of the invention. Method 900 may be performed, for example, by logic unit 110 of camera 100. In step 901, an indication is received that a video frame is to be taken. In step 902, a predetermined number of trial video frames are taken. Preferably, enough trial frames are taken that the time period required to take them encompasses at least one cycle of the expected camera vibration. For example, if the expected camera vibration has a period of 200 milliseconds and trial frames can be acquired at the rate of one frame each 20 milliseconds, then preferably at least 10 trial frames are taken in step 902.

In step 903, each of the trial frames is compared with a reference frame taken at a previous time. For example, a correlation value may be computed for each trial frame. In step 904, the one of the trial video frames that most closely correlates with the reference frame is output as the frame requested in step 901.

The invention claimed is:

1. A method, comprising timing the taking of at least one photographic exposure by a camera, the camera mounted with a camera mount on a vibrating object causing the camera to vibrate, in relation to the vibration so as to substantially avoid image degradation caused by the vibration, wherein a predetermined number of trial video frames is taken, wherein each trial video frame is compared with a reference frame, wherein the trial frame that most closely correlates with the reference frame is selected as the requested video frame, and wherein timing the taking further comprises delaying the taking of the exposure until the camera position deviates from a reference position by less than an amount configured to depend on characteristics of the camera, characteristics of the camera mount, the expected vibration, and a desired performance.

2. The method of claim 1, further comprising monitoring motion of the camera caused by the vibration, and wherein timing the taking of a photographic exposure further comprises delaying the starting time for the exposure until the monitored motion satisfies a motion criterion.

3. The method of claim 2, wherein the motion criterion is a reversal of direction of the camera motion.

4. The method of claim 2, wherein the motion criterion is a reversal of acceleration of the camera.

5. The method of claim 1, wherein timing the taking of a photographic exposure further comprises delaying the taking of the exposure until the camera position deviates from a reference position by less than a predetermined threshold amount.

6. The method of claim 5, wherein the camera position deviation is evaluated by comparing a trial video frame with a reference video frame.

7. The method of claim 6, wherein comparing the trial video frame with the reference video frame further comprises computing a correlation value for the two frames.

8. The method of claim 6, wherein only a portion of each frame is used in the comparison.

9. The method of claim 1, further comprising:
receiving an indication that a photographic exposure is to be taken; and
delaying the taking of the photographic exposure until either the camera position deviates from a reference position by less than a predetermined threshold amount or a predetermined maximum delay time has elapsed.

10. The method of claim 9, further comprising resetting the reference position after the predetermined maximum delay time has elapsed.

11. The method of claim 1, wherein timing the taking of a photographic exposure further comprises:
receiving an indication that a video frame is to be taken.

12. The method of claim 11, wherein comparing the trial video frame with the reference video frame further comprises computing a correlation value for the two frames.

13. The method of claim 11, wherein only a portion of each frame is used in the comparison.

14. The method of claim 1, wherein video jitter is avoided due to the effect of aliasing between a frequency of the vibration and a frequency at which video frames are taken.

15. A camera, comprising plural gyroscopes and logic, the camera mounted with a camera mount on a vibrating object causing the camera to undergo a vibrating motion, each gyroscope configured to produce voltages proportional to respective rates at which each gyroscope and the vibrating object are rotating for characterize rotations about more than one axis, the logic configured to time the taking of at least one photographic exposure by the camera in relation to the vibration so as to substantially avoid image degradation caused by the vibrating motion, wherein a predetermined number of trial video frames is taken, wherein each trial video frame is compared with a reference frame, wherein the trial frame that most closely correlates with the reference frame is selected as the requested video frame, and wherein the logic further comprises delaying the taking of the exposure until the camera position deviates from a reference position by less than an amount configured to depend on characteristics of the camera, characteristics of the camera mount, the expected vibration, and a desired performance.

16. The camera of claim 15, further comprising a motion sensing unit, and wherein the logic is further configured to delay the taking of a photographic exposure until the camera motion, as sensed by the motion sensing unit, satisfies a motion criterion.

17. The camera of claim 16, wherein the motion criterion is a reversal of direction in the vibrating camera motion.

18. The camera of claim 15, wherein the logic is further configured to time the taking of a photographic exposure by delaying the taking of the exposure until the camera position deviates from a reference position by less than a predetermined threshold amount.

19. The camera of claim 18, further comprising a motion sensing unit for determining the camera position.

20. The camera of claim 19, wherein the deviation of the camera position from the reference position is characterized by comparing a trial video frame with a reference video frame.

21. The camera of claim 20, wherein the comparison is performed by computing a correlation value from the trial video frame and the reference video frame.

22. The camera of claim 15, wherein the logic is further configured to receive an indication that a video frame is to be taken, take a predetermined number of trial video frames, compare each trial video frame with a reference frame, and select as the requested video frame the trial frame that most closely correlates with the reference frame.

23. A camera, comprising:
   means for characterizing camera motion resulting from the camera being mounted on a vibrating object;
   means for timing the taking of at least one photographic exposure in relation to the vibration so as to substantially avoid image artifacts caused by the vibration;
   means for taking a predetermined number of trial video frames;
   means for comparing each trial video frame with a reference frame;
   means for selecting the trial frame that most closely correlates with the reference frame as the requested video frame; and
   means for delaying in the taking of the exposure until the camera position deviates from a reference position by less than an amount configured to depend on characteristics of the camera, characteristics of the camera mount, the expected vibration, and a desired performance.

* * * * *

UNITED STATES PATENT AND TRADEMARK OFFICE
CERTIFICATE OF CORRECTION

PATENT NO. : 7,460,773 B2 Page 1 of 1
APPLICATION NO. : 11/294782
DATED : December 2, 2008
INVENTOR(S) : Theodore B. Ziemkowski It is certified that error appears in the above-identified patent and that said Letters Patent is hereby corrected as shown below:

In column 3, line 47, delete " $(\Theta_x > 0),$ " and insert -- $(\dot{\Theta}_x > 0),$ --, therefor.

In column 3, line 49, delete " $(\Theta_x < 0).$ " and insert -- $(\dot{\Theta}_x < 0).$ --, therefor.

In column 10, line 11, in Claim 23, after "delaying" delete "in".

Signed and Sealed this

Twenty-third Day of June, 2009

JOHN DOLL
*Acting Director of the United States Patent and Trademark Office*